March 15, 1960

S. ROBERTS 2,928,298

DRILL JIGS

Filed Nov. 14, 1958

INVENTOR.
SIDNEY ROBERTS
BY
ATTORNEY

March 15, 1960     S. ROBERTS     2,928,298
DRILL JIGS

Filed Nov. 14, 1958     2 Sheets-Sheet 2

*INVENTOR.*
SIDNEY ROBERTS
BY
*ATTORNEY*

United States Patent Office 2,928,298
Patented Mar. 15, 1960

2,928,298

DRILL JIGS

Sidney Roberts, Flushing, N.Y., assignor to Micromatic Machine Corp., Brooklyn, N.Y., a corporation of New York Application November 14, 1958, Serial No. 773,995

17 Claims. (Cl. 77—62)

This invention relates to drill jigs.

An object of this invention is to provide an improved portable drill jig or fixture which may be taken from one drill press to another, without regard to type of drilling head or drill press, and which shall comprise a depressible jig top plate and arms fixed thereto carrying drill bushings and adapted to clamp a work piece to be drilled against the base of the jig or fixture, said arms being maneuverable to adjust for various centers between drill holes.

A further object of this invention is to provide in a fixture of the character described, clamp arms which may be clamped to the top or bottom of the adjustable jig or fixture top plate.

Yet another object of this invention is to provide in a drill jig or fixture of the character described, a top plate which is removable from guide pins of the base, together with the clamp arms attached thereto, and used separately from the fixture as a portable jig for drilling work too large to handle in a fixed jig, and which can also be used in connection with a portable electric drill, if desired.

Yet another object of this invention is to provide in a drill jig of the character described, clamp arms which have a double function of clamping the work and of carrying the drill bushings, and which are reversible, so that a foot on one arm carrying a bushing can be put in advance of a bushing at one end of a straight arm, which can be used with the foot extending to left or right, and which arms are adjustable both lengthwise and rotationally.

Yet a further object of this invention is to provide in a drill jig of the character described, arms that can be premounted on the jig top plate separately from the fixture and the plate with the arms clamped thereto thereafter mounted on the fixture.

Yet another object of this invention is to provide in a drill jig or fixture of the character described, a hand operated clamp which makes for quick release and uniform holding pressure so that each time the cam handle comes down the same clamp pressure will be obtained on a similar work piece mounted on the base of the jig or fixture.

Yet a further object of this invention is to provide a strong, rugged, and durable device of the character described, which shall be adjustable, which shall be easy to manipulate, relatively inexpensive to manufacture, sure and positive in operation, and practical and efficient to a high degree in use.

Other objects of this invention will in part be obvious and in part hereinafter pointed out.

The invention accordingly consists in the features of construction, combination of elements, and arrangement of parts, which will be exemplified in the construction hereinafter described, and of which the scope of invention will be indicated in the following claims.

In the accompanying drawings in which is shown various illustrative embodiments of this invention, Fig. 1 is a top plan view of a drill jig or fixture embodying the invention, with part of the cam handle broken away;

Figure 1:
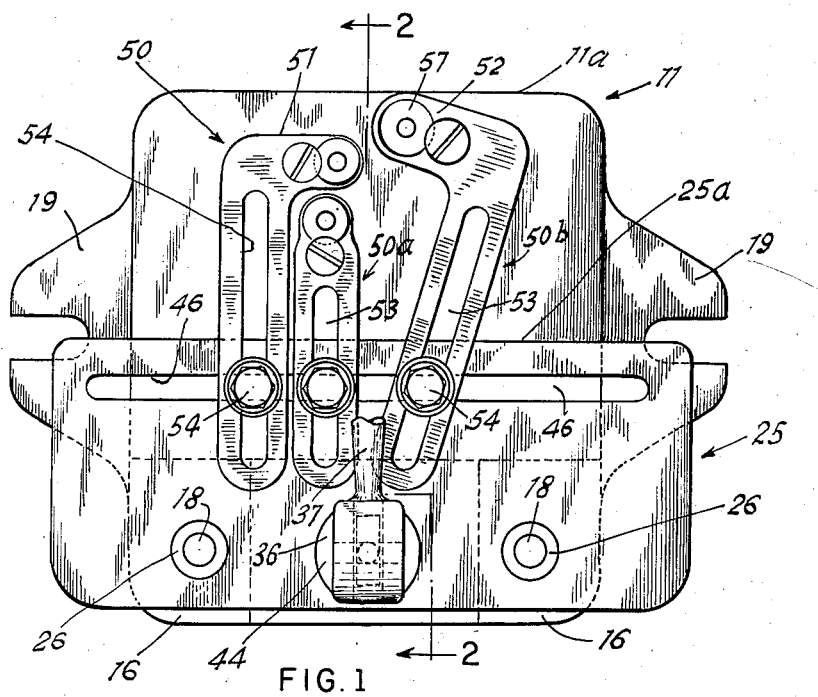
Figure 4:
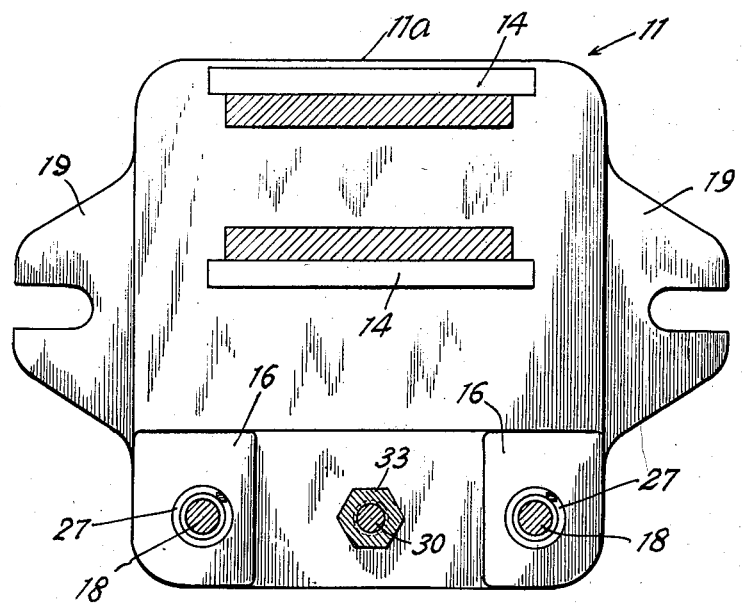
Fig. 4 is a top plan view of the jig base taken along line 4—4 of Fig. 3.

Referring now in detail to the drawing, 10 designates a drill jig or fixture embodying the invention. The same comprises a base 11. Said base 11 has a depressed upper surface 12, on which the work piece 13 to be drilled is mounted. Any suitable work-piece guide means 14 may be attached to the base, so that each work piece may be placed in the same position on the base.

At one end of the base 11 is a raised platform portion 15 having a still higher raised end portion 16. Fixed to the portion 16, and upstanding therefrom, are parallel vertical guide pins 18. The lower ends of the pins 18 are received and fixed in through openings 18a formed in the base.

The base 11 may be provided with the usual side-slotted arms 19 for receiving bolts for bolting the base to any suitable support.

The portion 15 of the base 11 is, furthermore, formed with a central vertical screw-threaded opening 20, preferably aligned with the pin openings 18a. The opening 20 is internally screw-threaded, and screwed thereto, and extending upwardly therefrom, is a stud 22 for the purpose hereinafter appearing.

Slidably mounted on the pins 18 is a jig top plate 25. The top plate 25 may be provided with suitable bushings 26 receiving the pins 18. Interposed between the plate 25 and the base 11, and surrounding the pins 18, are coil compression springs 27 for biasing the jig plate 25 upwardly. Said jig top plate is formed with a central opening 29 aligned with the threaded opening 20. A lock nut 22b is screwed to stud 22 and contacts the base, to prevent turning of said stud.

Extending through the opening 29 is the shank 30 of an eye 31. At the lower end of the shank 30 is a loop 32. The lower end of the shank 30 is threaded, as is also the upper end of the pin 22. Said shank 30 and the pin 22 screw into opposite ends of a sleeve 33 which may have a polygonal external surface. Lock-nuts 22a and 30a on the pin 22 and shank 30, respectively, serve to lock said pin and shank to the sleeve 33 in vertically adjusted positions.

Figure 2:
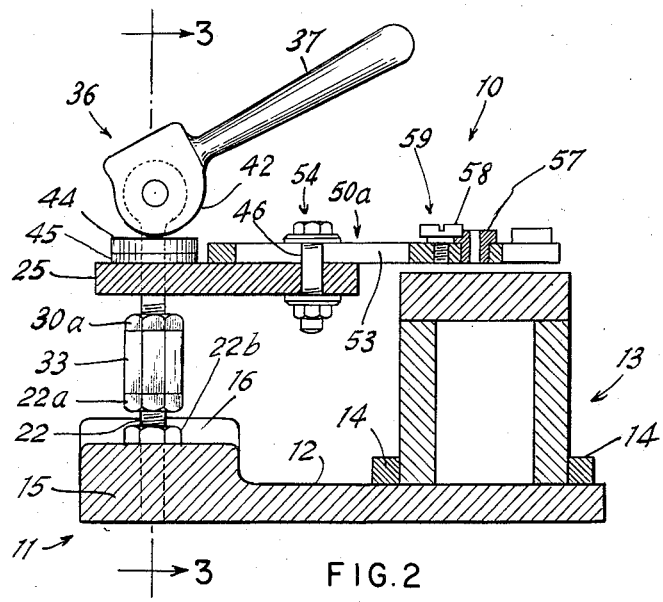
Fig. 2 is a cross-sectional view taken along line 2—2 of Fig. 1.
Figure 3:
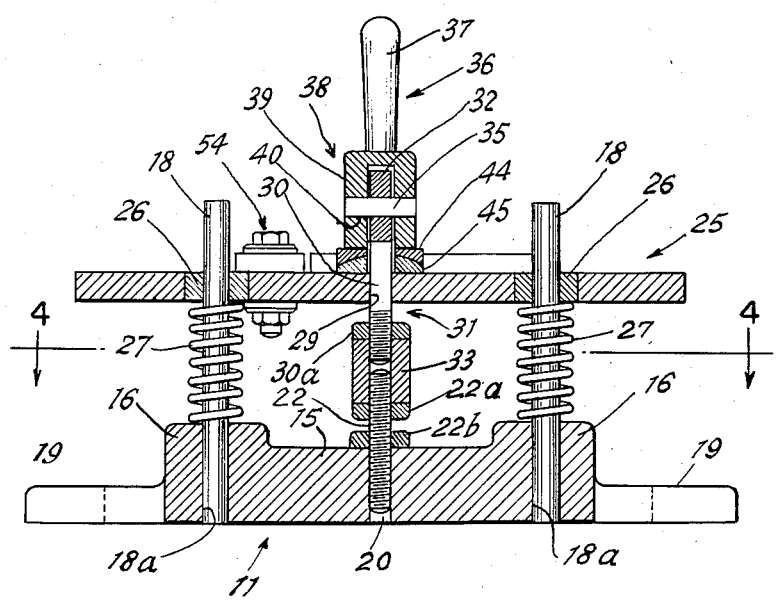
Fig. 3 is a cross-sectional view taken along line 3—3 of Fig. 2.

Extending through the loop 32 is a pin 35, and rotatably mounted on the outwardly extending ends of the pin 35 is a handle actuated cam 36. Member 36 has a handle portion 37 and a head 38. The head 38 has side walls 39, straddling the loop 32, and formed with aligned openings 40 receiving the outer ends of the pin 35. The walls 39 have cam edges 42 so arranged that as the handle 37 is swung downwardly and forwardly, in the direction of the arrow shown in Fig. 2, the plate 25 will be pressed downwardly against the pressure of the springs 27.

Interposed between the plate 25 and the cam edges 42 are a pair of interengaging spherical washers 44, 45. When the handle 37 is swung upwardly the compression springs 27 will quickly raise the jig plate 25. Said jig plate 25 has a front edge 25a disposed rearwardly of the front edge 11a of the jig base 11, as shown in Fig. 1 of the drawing. Said jig top plate 25 is formed with a pair of longitudinally extending aligned slots 46, parallel to and adjacent the edge 25a.

Attached to the jig top plate 25 are a plurality of drill jig clamp arms 50, 50a, 50b. It will be noted that arm 50a is short and straight; arm 50 is longer than arm 50a and has an offset foot 51 extending to the right, whereas arm 50b is longer than arm 50, and has a foot 52 extending to the left. Each of the arms is formed with a longitudinal slot 53 crossing one or the other of the slots 46. Extending through the slots 53, 46, are bolts 54 attaching said arms to the jig plate 25. Each of the arms 50, 50a, 50b, is provided with an opening 56 to receive a drill bushing 57. The drill bushing 57 has a head contacting the top of the arm and formed with a curved recess to receive the head 58 of a retaining screw 59. It will now be observed that the arms 50, 50a, 50b, may be moved longitudinally and rotationally so as to obtain a large variety of locations for the drill bushings 57. The bushings 57 may be of various sizes. The arms 50, 50a, 50b may be attached to the underside of the jig plate 25 as well as to the upper side thereof.

When the handle 37 is swung downwardly, the arms 50, 50a, 50b, will clamp the work piece 13 against the base, and then the drilling operation can be carried on. When the handle is swung upwardly, the work piece will be quickly released.

The drill jig top plate 25, with the clamp arms thereon, may be used separately from the base. It may be removed therefrom by first removing the pin 31 and cam 36. It will now be observed that the drill bushing clamp arms can be clamped to the top or bottom of the adjustable jig top plate. The jig top plate is removable from the guide pins 18, and with the clamp arms, can be used separately from the fixture as a portable jig for drilling work too large to handle in the jig, and can be used also in connection with a portable electric drill.

The clamp arms have a double function of clamping the work piece and carrying the drill bushings. Said arms are reversible and can be maneuvered to position the drill bushings in various places with relation to each other. The arms 50 and 50b may be reversible so that the feet 51, 52, extend in directions opposite to the direction shown in the drawing. The arms, furthermore, may be premounted on a jig top plate separately from the fixture, and then mounted on the base of the fixture, which makes for ease in accurately placing the drill jig fixture. There will be a uniform holding pressure each time the cam handle comes down on a similar work piece.

It will thus be seen that there is provided an apparatus in which the several objects of this invention are achieved and which is well adapted to meet the conditions of practical use.

As possible embodiments might be made of the above invention, and as various changes might be made in the embodiment above set forth, it is to be understood that all matter herein set forth or shown in the accompanying drawings is to be interpreted as illustrative and not in a limiting sense.

I claim:

1. A drill jig fixture comprising a base, a pair of guide pins fixed therein and extending upwardly therefrom, a jig top plate slidably mounted on said pins, springs interposed between the jig top plate and the base and surrounding the guide pins, said jig top plate being formed with a longitudinal slot, a plurality of arms having longitudinal slots crossing the slot in the jig top plate, means extending through the crossing slots for attaching the arms to the jig top plate, said arms being adjustable longitudinally and rotationally about said extending means and relative to the jig top plate, and drill bushings on said arms.

2. The combination of claim 1, in combination with handle-actuated cam means for depressing said jig plate against the action of said compression springs.

3. The combination of claim 2, said handle-actuated cam means comprising a stud screwed to the base and extending upwardly therefrom, a sleeve screwed to the stud, a pin extending through an opening in the jig top plate and screwed to the sleeve, said last-mentioned pin having a loop at its upper end, a cam rotatably mounted on said loop and a handle on said cam.

4. In combination, a base, pins extending upwardly from the base, a jig top plate slidably mounted on said pins, said jig top plate being formed with a longitudinal slot, an arm having a longitudinal slot crossing the slot in the jig top plate, a bolt passing through the crossing slots for fixing said arm in angular and longitudinal adjusted positions relative to said plate, said arm being rotatable about said bolt in various longitudinal positions of said arm, said arm having an opening and a drill bushing received in said opening.

5. The combination of claim 4, in combination with spring means biasing the jig plate upwardly relative to the base, and hand-actuated cam means for depressing the jig plate.

6. The combination of claim 5, said arm having an offset foot at one end in which the bushing opening is formed.

7. The combination of claim 5, said base extending beyond an edge of said jig plate, and said arm projecting beyond said edge and overlying a portion of the base on which a work piece may be mounted.

8. The combination of claim 5, said cam means including means to limit the upward movement of the jig plate, and means for adjusting said upward limiting means.

9. The combination of claim 2, said handle-actuated cam means comprising means fixed to said base and passing upwardly through an opening in the top plate, a cam rotatably mounted on the upper end of said fixed means, and disposed above said top plate and engaging the top of said plate, and a handle fixed to said cam.

10. The combination of claim 9, in combination with spherical washers interposed between said cam and top plate.

11. A drill jig fixture comprising a base, a pair of guide pins fixed thereto and extending upwardly therefrom, a jig top plate slidably mounted on said pins, means for depressing said top plate, a plurality of arms, means for detachably attaching said arms to said top plate in longitudinal and rotational adjustable positions, said last means including means to permit rotational adjustment of said arms in their various longitudinally adjusted position, with said arms projecting beyond the plate, and drill bushings on the projecting portions of said arms.

12. The combination of claim 11, at least one of said arms having an offset foot at a projecting end, supporting one of said drill bushings.

13. The combination of claim 4, said arm having an offset foot at one end in which the bushing opening is formed.

14. The combination of claim 4, in combination with means engaging the top of the jig top plate for depressing said jig top plate.

15. The combination of claim 4, said arm having a portion extending beyond the edge of the jig top plate and overlying a portion of the base on which a work piece may be mounted.

16. The combination of claim 15, said projecting portion on said arm being formed with an offset foot in which the bushing opening is formed.

17. The combination of claim 3, in combination with a lock nut on the stud contacting the base, and lock nuts on said stud and pin contacting opposite sides of said sleeve.

References Cited in the file of this patent

UNITED STATES PATENTS

| | | |
|---|---|---|
| 2,388,621 | Sirp et al. | Nov. 6, 1945 |
| 2,619,730 | Carter | Dec. 2, 1952 |

FOREIGN PATENTS

| | | |
|---|---|---|
| 988,677 | France | May 9, 1951 |